United States Patent [19]

Shutt

[11] 4,170,386
[45] Oct. 9, 1979

[54] CONTROL FOR A TWO STAGE MASTER CYLINDER

[75] Inventor: Paul B. Shutt, St. Joseph, Mich.

[73] Assignee: The Bendix Corporation, Southfield, Mich.

[21] Appl. No.: 832,134

[22] Filed: Sep. 12, 1977

[51] Int. Cl.$^2$ .................... B60T 11/20; B60T 11/08
[52] U.S. Cl. .................... 303/6 C; 60/545;
60/561; 60/562; 60/574; 60/591
[58] Field of Search .............. 60/562, 574, 575, 576,
60/577, 578, 591, 592, 534, 535, 545, 561; 303/6 C

[56] References Cited

U.S. PATENT DOCUMENTS

| | | | |
|---|---|---|---|
| 2,031,360 | 2/1936 | Boughton | 60/578 |
| 2,820,347 | 1/1958 | Highland | 60/578 |
| 3,062,010 | 11/1962 | Krusemark | 60/578 |
| 3,165,896 | 1/1965 | Baldwin | 60/562 |
| 3,232,628 | 2/1966 | Brand | 60/562 |
| 3,667,229 | 6/1972 | Cresto | 60/578 |
| 3,677,606 | 7/1972 | Shutt | 60/562 |
| 3,686,864 | 8/1972 | Shutt | 60/562 |
| 4,027,482 | 6/1977 | Manzini | 60/591 |
| 4,086,770 | 5/1978 | Shaw | 60/574 |

Primary Examiner—Abraham Hershkovitz
Attorney, Agent, or Firm—Leo H. McCormick, Jr.; Ken C. Decker

[57] ABSTRACT

A two stage master cylinder having a bore with a first diameter and a second diameter separated by a shoulder. A first piston is located in the first diameter of the bore to establish a first chamber. A second piston has a first section located in the first diameter of the bore to establish a second chamber and a second section located in the second diameter of the bore to establish an actuation chamber therein. A first passage in the second piston connects the actuation chamber with the second chamber. A second passage in the second piston connects the first passage to a reservoir in the housing. A shuttle piston located in the first passage has a first surface area exposed to the second chamber and a second smaller surface area exposed to the actuation chamber. A spring urges the shuttle piston toward the second chamber. An input force from an operator moves the second piston causing fluid to flow from the actuation chamber through the first passage to the second chamber. The first section of the second piston acts on actuation fluid and the operational fluid in the second chamber and the first piston acts on the operational fluid in the first chamber to provide the front and rear wheel brakes with a braking signal. The operational fluid in the second chamber acts on the first surface of the shuttle and overcomes the spring to establish communication of between the actuation chamber and the reservoir through the second passage. Thereafter, the entire input force from the operator acts on the first section of the second piston to pressurize the operational fluid in the first and second chambers in the generation of the braking signal.

10 Claims, 3 Drawing Figures

CONTROL FOR A TWO STAGE MASTER CYLINDER

BACKGROUND OF THE INVENTION

This invention relates to a two stage master cylinder having a two diameter piston or two concentric pistons whose initial movement supplies a brake system with a large volume of hydraulic fluid at a relatively low pressure for bringing the brake shoes or pads into contact with brake drum or rotors and whose subsequent movement supplies the brake system with a relatively small volume of hydraulic fluid at a high pressure for actually effecting a brake application.

An early example of a two stage master cylinder is found in U.S. Pat. No. 1,892,335. In this type of two stage master cylinder lost motion associated with mechanical linkages in a brake system are essentially overcome through the use of a two step braking process wherein a high volume of hydraulic fluid moves the brake shoes into contact with the brake drums and thereafter a smaller volume of fluid at a high pressure effects a brake application.

In an effort to improve the transitional operation of a two stage master cylinder, various valving arrangements such as disclosed in U.S. Pat. Nos. 3,631,676 (Krusemark) and 3,802,199 (Hagberg Jr.), have been proposed. These valves control the shifting of the operational input force from a large diameter of the piston to a smaller diameter when a predetermined pressure occurs in the brake system. Unfortunately, the pressure produced above the predetermined pressure still acts on a larger diameter of the piston over the entire brake pressure range of the master cylinder.

U.S. Pat. No. 3,667,229 (Cresto), illustrates a valve for a two stage master cylinder which eliminates the input force acting on the large diameter above the transition pressure. Unfortunately, the operational shift from the large to the small diameter of the piston occurs during high pressure fluid production. When such a transition occurs, the brake pedal moves with an increased rate of angular travel giving a driver the impression of brake fade or failure.

Copending U.S. Patent Application 810,138 filed June 27, 1977 discloses a two stage master cylinder having a control member located in a reservoir chamber and responsive to the operational fluid pressure of a brake signal for transferring that portion of an input force acting on a large diameter of a stepped piston to a smaller diameter to generate a brake signal corresponding to an operator input signal.

SUMMARY OF THE INVENTION

I have devised a simplified control member for proportionally transferring that portion of an input force acting on a large diameter of a stepped diameter operational piston to a smaller diameter of the piston to provide a smooth brake application force for operating a two stage master cylinder.

The control member is located in a passage in a stepped diameter operational piston which connects an actuation fluid chamber with an operational fluid chamber. First and second radial bores in the stepped piston connect the first passage to a relief chamber or reservoir located in the housing of the two stage master cylinder. A stepped diameter shuttle piston located in the passage in the stepped diameter operational piston controls the communication of fluid from the passage into either the operational fluid chamber or the reservoir. An operator input force applied to the stepped diameter operational piston causes a volume of actuation fluid to flow from the actuation chamber through the passage, past the shuttle piston and into the operational fluid chamber. Thereafter, a smaller diameter of the stepped operational piston pressurizes the operational fluid and the actuation volume of fluid to produce a brake pressure corresponding to the operator input force and effect a brake application. The brake pressure acts on the stepped diameter shuttle piston and when a predetermined brake pressure develops, the stepped diameter shuttle piston moves to divert the actuation fluid to the reservoir through the first radial bore. Thereafter, the entire operator input force is transferred into the smaller diameter of the stepped operational piston as the volume of actuation fluid is metered through the radial bore to optomize the production of brake pressure in the master cylinder.

If the rate of application of the input force from the operator exceeds a predetermined rate, rapid movement of the first diameter of the stepped piston in the operational fluid chamber causes a brake pressure build-up which acts on the shuttle piston and attempts to provide communication through the first radial bore before an appreciable volume of actuation fluid passes through the passage from the actuation chamber. However, the movement of the stepped diameter shuttle piston is retarded by a hydraulic fluid block created between a land on the stepped diameter shuttle piston and a shoulder on the stepped diameter operational piston in the passage. The hydraulic fluid block is relieved by the flow of fluid through a second radial bore connected to the relief chamber or reservoir. Thus, the communication of a minimum volume of actuation fluid into the operational fluid chamber is assured before fluid communication to the reservoir through the first bore commences.

It is an object of this invention to provide a two stage master cylinder with a control member for sequentially allowing a volume of actuation fluid to be communicated from an actuation chamber to an operational chamber and a reservoir in response to movement of a stepped diameter piston in a bore by an operator input force.

It is another object of this invention to provide a control member for a two stage master cylinder that prevents communication between an actuation chamber and a reservoir until at least a minimum volume of actuation fluid is communicated to an operational chamber during movement of an operational piston by an operator input force.

It is a further object of this invention to provide a two stage master cylinder with a control member having a shuttle valve member which proportionally transfers that portion of an input force acting on a large diameter of a stepped piston to a smaller diameter as a function of the brake pressure produced by an input force.

These and other objects should be apparent from reading this specification and viewing the drawings.

BRIEF DESCRIPTION OF THE DRAWINGS

FIG. 3 is an enlarged cross-sectional view of the circumscribed portion of FIG. 2.

DETAILED DESCRIPTION OF THE INVENTION

Figure 1:
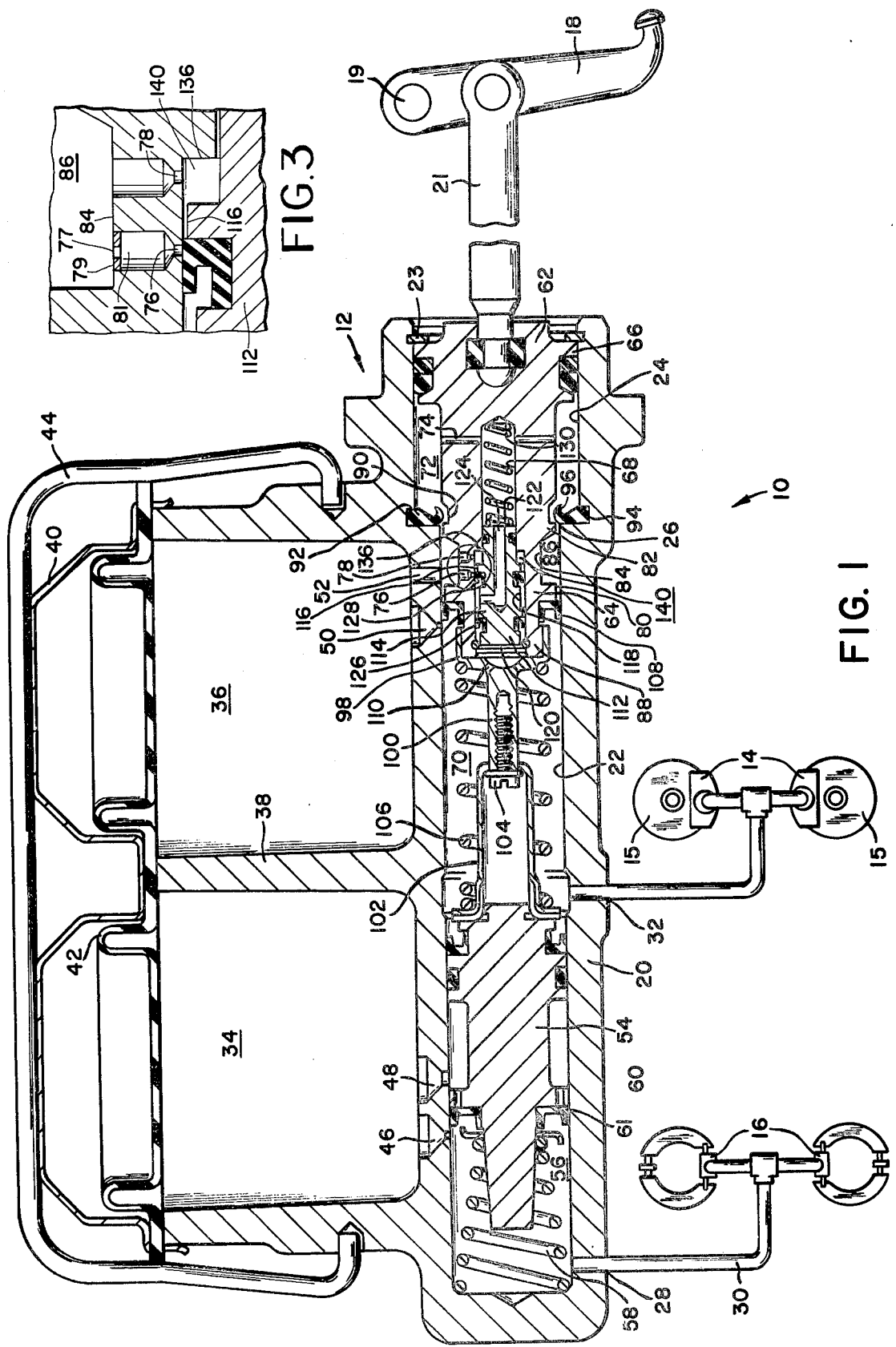
FIG. 1 is a schematic illustration of a brake system including a sectional view of a two stage master cylinder constructed according to the principles of this invention.

The brake system 10, shown in FIGS. 1 and 3, includes a two stage master cylinder 12 which is connected to the front and rear wheel brakes 14 and 16, respectively, of a vehicle. The two stage master cylinder 12 responds to an operator input force applied to brake pedal 18 for effecting a brake application.

In more particular detail, the two stage master cylinder 12 has a housing 20 with a stepped bore therein having a first diameter 22 separated from a second diameter 24 by a shoulder 26. The housing 20 has a first outlet port 28 which connects the first diameter 22 of the stepped bore to the rear wheel brakes 16 through conduit 30 and a second outlet port 32 which connects the first diameter 22 of the stepped bore to the front wheel brakes 14.

The housing 20 has a reservoir with a first chamber 34 separated from a second chamber by a wall 38. A cap 40 and diaphragm 42 are held against the housing 20 by a bail wire 44 to seal the first and second chambers 34 and 36 from the surrounding environment.

The first chamber 34 has a first vent port 46 and a first replenishing port 48 through which fluid is communicated into the fluid diameter 22 of stepper bore. Similarly the second chamber 36 has a second vent port 50 and a second replenishing port 52 through which fluid is communicated into the first diameter 22 of the stepped bore.

A first piston 54 located in the first diameter 22 of the stepped bore cooperates with the housing 20 to define a first chamber 56. A return spring 58 positions a land 60 on the first piston 54 between the first vent and compensating ports 46 and 48, respectively, to establish the size of the first chamber 56.

A second piston 62 has a first diameter section 64 which extends from a second diameter section 66 into the first diameter 22 of the stepped bore to define a second chamber 70. The second diameter section 66 in conjunction with the first diameter section 64, shoulder 26, and housing 20 define an actuation chamber 72. The second piston 62 has a blind stepped axial bore 68 which extends through the first diameter section 64 to a point adjacent the second diameter section 66.

The actuation chamber 72 is connected to the second chamber 70 through a first radial bore 74 and the blind stepped axial bore 68. Actuation chamber 72 is also connected to reservoir chamber 36 through second and third radial bores 76 and 78.

The second piston 62 has a first land 80 on the first diameter section 64, adjacent the second radial bore 76, separated from a second land 82 by a first groove 84. The second and third radial bores 76 and 78 terminate in the first groove 84. The first groove 84 acts as a relief chamber for providing a continual communication path between the fift and second radial bores 76 and 78 and replenishing port 52 upon movement of the second piston 62.

A seal 92, which has a face abutting shoulder 26 and a lip 96 projecting into actuation chamber 72, controls communication between the actuation chamber 72 and the first groove 84. In the release position shown in FIG. 1, the lip 96 is positioned in a groove 90 on the first diameter section 64 of piston 62 to allow fluid to flow between actuation chamber 72 through the clearance of the second land 82, the first diameter 22 of the stepped bore and groove 84.

An annular projection 88 on the second piston 62 extends from the first land 80 into the second chamber 70. A retainer cap 98, which surrounds the annular projection 88, has a series of openings 110 for connecting the stepped axial bore 68 with the second chamber 70. A stem 100 is connected to a retainer 102 by a bolt 104 for caging a spring 106. The spring 106 positions the lip seal 108 and first land 80 between the second vent and replenishing ports 50 and 52, respectively, to establish the size of the second chamber 70.

Communication of fluid through the stepped axial bore 68 to the second chamber 70 is controlled by a stepped shuttle piston 112. The shuttle piston 112 has a cylindrical body. A first land 114 on a first section of the cylindrical body is separated from a second land 116 by a groove 118, while a second smaller section is slidably retained in the stepped axial bore 68. Face 120 on the first section is exposed to the brake pressure generated in chamber 70 while face 122 on the cylindrical body is exposed to the fluid pressure generated in the actuation chamber 72. A passage 124 in the cylindrical body connects bore 68 with groove 118. Lip seals 126 and 128 located adjacent lands 114 and 116 prevent the flow of fluid from the groove 118 to the second radial bore 76 when spring 130 urges the shuttle piston 112 toward chamber 70.

MODE OF OPERATION OF THE INVENTION

When a vehicle operator desires to effect a brake application, an input force is applied to pedal 18. Pedal 18 responds to the input force by rotating around pin 19 to impart a linear force to push rod 21 connected to piston 62.

Initial movement of piston 62 moves seal 108 past vent port 50 and groove 90 past lip 96 of seals 92 to respectively seal the second chamber 70 and actuator chamber 72 from the reservoir chamber 36.

At the same time, spring 106 moves seal 61 adjacent land 60 on piston 54 past vent port 46 to seal chamber 56 from reservoir chamber 34.

As piston 62 moves in response to the operator input force, a volume of actuator fluid is communicated into the second or outlet chamber 70 from the actuator chamber 72 by flowing through radial bore 74, axial bore 68, passage 124, groove 118 and past lip seal 126. The volume of actuator fluid is combined with operational fluid in chamber 70 to move the pistons in the disc brakes 14 on the front wheels against the rotors 15.

The input force continues to move the second piston 62 in the outlet chamber 70 to develop a brake pressure force in the combined fluid. When the brake pressure which acts on face 120 reaches a predetermined value, shuttle piston 112 moves in opposition to spring 130 and the force generated across face 122 by the pressure of the actuation fluid in chamber 72. The movement of the shuttle piston 112 is smooth since the fluid between land 116 and stop 136 in dampening chamber 140 must pass through radial bore 78 into the groove 84 and relief chamber 86 as the shuttle piston 112 moves.

Figure 2:
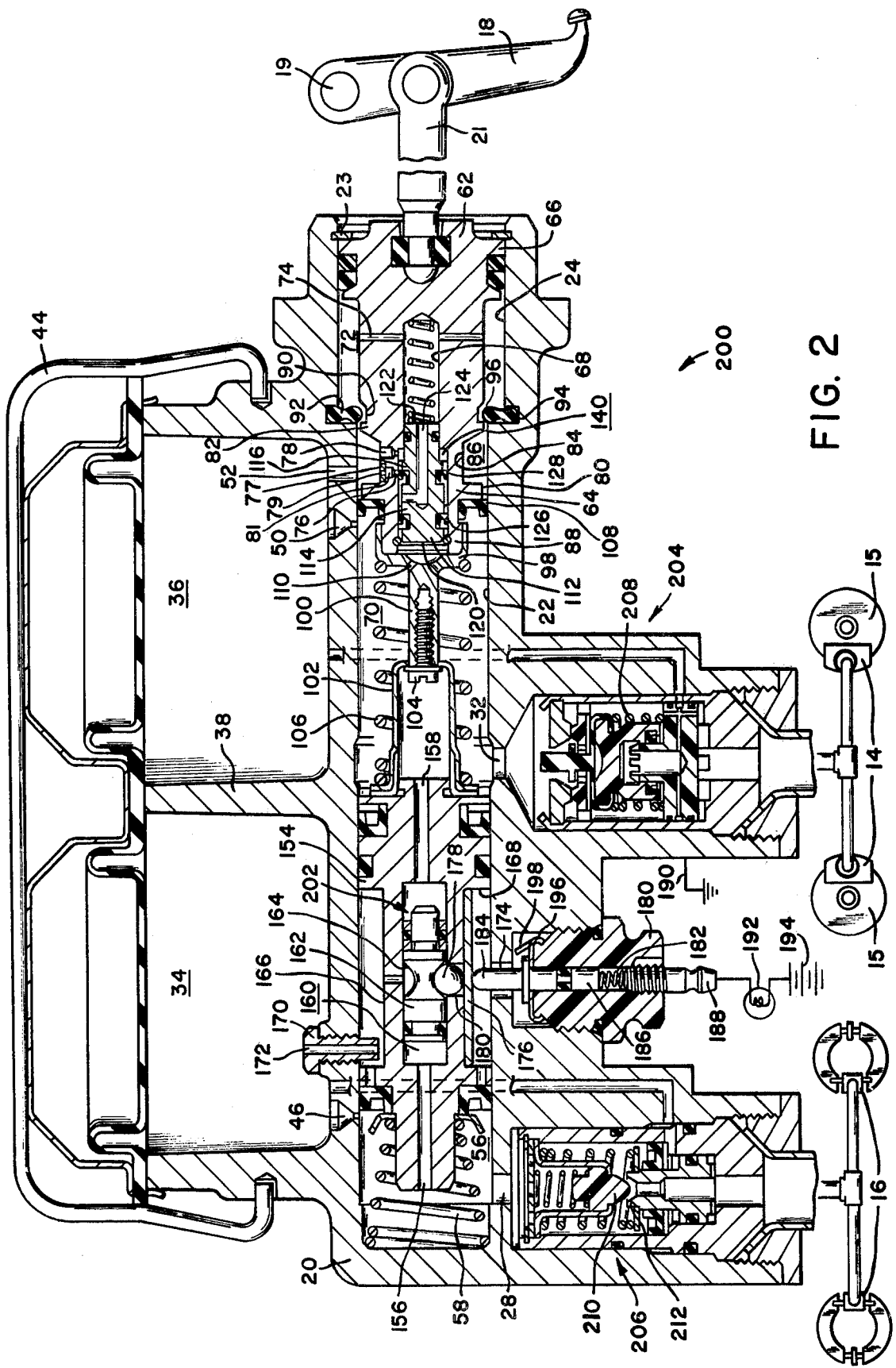
FIG. 2 is a schematic illustration of a brake system including a sectional view of another two stage master cylinder constructed according to the principles of this invention.

When lip seal 128 moves past the radial bore 76, the actuation fluid in groove 118 flows through radial bore 76 into grove 84 in the FIG. 1 embodiment, while in the FIG. 2 embodiment actuation fluid flows from radial bore 76 into a noise suppressor chamber 81 before passing through orifice 77 in restrictor plate 79 and into groove 84 for communication to reservoir chamber 36 through relief chamber 86. Thereafter, the brake pressure in chamber 70 acts on face 120 to move land or rib 116 against stop 136 to provide free communication between the actuation chamber 72 and the reservoir chamber 36.

Thereafter, the entire input force applied to brake pedal 18 is applied to the first section 64 of piston 62 to pressurize the fluid in chamber 70 and supply the front and rear wheel brakes 14 and 16 with an operational braking force.

Upon termination of the input force to brake pedal 18, return spring 58 and caged spring 106 move pistons 54 and 62 toward stop 23. As piston 62 moves toward stop 23, fluid from relief chamber 86 is drawn into actuation chamber 72 by flowing past lip 96 on seal 92 and through radial bore 76 to groove 118 for distribution to the axial bore 68.

When the brake pressure in chamber 70 is reduced to a predetermined value, spring 130 moves the shuttle piston 112 toward chamber 70 to interrupt communication from groove 118 as seal 128 moves past radial bore 76.

Thereafter, return springs 58 and 106 move pistons 54 and 62 to their rest position shown in FIG. 1.

In the two stage master cylinder 200 shown in FIG. 2, wherein the same or similar components are used in FIG. 1 are disclosed, the same reference numeral is used to identify the component.

The two stage master cylinder 200, shown in FIG. 2, in addition to the functional feature of being able to deliver a large volume of fluid to the disc brakes 14 from chamber 70 through the operation of the stepped diameter piston 62 and shuttle piston 112 includes a failure warning activation mechanism 202 located in piston 154, a metering valve 204 located in outlet port 32 which connect chamber 70 with the front wheel brakes 14 and a proportioning valve 206 located in outlet port 28 which connects chamber 56 with the rear wheel brakes 16.

In more particular detail, piston 154 has a cylindrical body with first and second axial bores 156 and 158 which respectively connect chambers 56 and 70, with a pressure differential chamber 160. A wall or piston 162 located in chamber 160 prevents fluid communication between chambers 56 and 70. Piston 154 has a first slot 166 and a second slot 168 located on opposite sides of the peripheral surface. A stop bolt 170 which limits the rearward movement of piston 154 has a passage 172 for connecting slot 166 with reservoir chamber 34. In addition bolt 170 cooperates with slot 166 to prevent piston 154 from rotating axially in bore 22 in response to a operator input applied to brake pedal 18.

A plunger 174 attached to a switch body 180 extends into slot 168 to engage a lever 176 retained therein. A ball 178 located in a radial bore 180 is urged into groove 164 on piston 162 by spring 182 which acts on plunger 174. End 184 of plunger 174 is electrically non-conductive while end 186 is electrically conductive. End 186 is connected to terminal 188 through spring 182 and is adapted to complete an electrical circuit between ground 190, light 192, and battery 194 when end 196 of an annular disc 198 engages housing 20. Such movement occurs when a pressure differential develops between chambers 56 and 70 that causes piston 162 to move from a centered position as shown in FIG. 2. When piston 162 moves, ball 178 follows ramp or groove 164 and provides lever 176 with movement that causes plunger 174 to rotate end 196 on the annular disc into engagement with housing 20.

The metering valve 204 and the proportioning valve 206 are fully disclosed in copending U.S. Patent Application 776,343 filed Mar. 10, 1977 and incorporated herein by reference.

The metering valve 204 is adapted to initially allow a relatively large volume of fluid to flow from chamber 70 and bring the brake pads on disc brakes 14 into engagement with the rotors 15 associated with the front wheels. When the fluid pressure in chamber 70 reaches a predetermined value sufficient to move shuttle piston 112 and allow the actuation chamber 72 to be communicated to reservoir chamber 36, spring 208 in the metering valve 204 is overcome and the brake pressure generated in chamber 70 through the movement of the first diameter 64 in bore 22 is supplied to the front wheel disc brakes 14.

The proportioning valve 206 is adapted to allow the brake pressure generated in chamber 56 to be freely communicated to the rear wheel brakes 16 until a predetermined brake pressure develops through the movement of piston 154 in bore 22. Thereafter, poppet valve 210 moves into engagement with seat 212 to only allow a portion of the brake pressure produced therein to be communicated to the rear wheel brakes 16.

I claim:
1. A two stage master cylinder comprising:
a housing having a first diameter bore separated from a larger second diameter bore by a shoulder and a reservoir connected to said first diameter bore;
a first piston located in said first diameter bore and cooperating with said housing to define a first chamber in said first diameter bore;
a second piston having a first cylindrical body with a first diameter section extending from a second diameter section into said first diameter bore and cooperating with said housing and said first piston to define a second chamber in said first diameter bore, said second diameter section cooperating with said first diameter section, said shoulder, and said housing to define an actuator chamber in said second diameter bore, said first cylindrical body having a stepped axial bore extending through said first diameter section to a point adjacent said second diameter section, said first cylindrical body having a first radial passage for connecting said actuation chamber wtih said axial bore and a second radial passage for connecting said axial bore to said reservoir;
shuttle means located in said stepped axial bore of said first cylindrical body having a first surface exposed to the fluid in said second chamber and a second surface exposed to the fluid in said actuation chamber, said first surface being larger than said second surface, said shuttle means including a second cylindrical body having a first section separated from a second section by a second shoulder, said second shoulder cooperating with said stepped axial bore and the first section of said second cylindrical body to define a dampening chamber, a radial bore providing restricted fluid communication between the dampening chamber and the reservoir, the fluid pressure in said dampening chamber oper- ating to control the rate of movement of said shuttle means;

first seal means associated with said shuttle means for controlling the communication of fluid from said stepped axial bore into said second chamber and said reservoir;

resilient means connected to said shuttle means for urging said first surface toward said second chamber; and input means connected to said second piston and responsive to an input force for moving said first diameter section in said first diameter bore and said second diameter section in said second diameter bore to create an actuation fluid pressure in said actuation chamber and an operational fluid pressure in said second chamber, said actuation fluid pessure being communicated to said second chamber by flowing through said first radial passage into said stepped axial bore and around said first seal means, said operational fluid pressure acting on said first surface and moving said shuttle means in opposition to said resilient means and actuation fluid pressure acting on said second surface to communicate said axial bore to said reservoir and thereby relieve the actuation fluid pressure from said second bore to permit the entire input force to be communicated into said second piston means for moving said first diameter section in the first diameter bore and thereafter pressurize the fluid in the second chamber.

2. The two stage master cylinder, as recited in claim 11 wherein said second piston further includes:

a first groove located between a first land and a second land, said second radial passage terminating in said first groove adjacent said first land, said first groove connecting said second radial passage with said reservoir upon movement of said second piston.

3. The two stage master cylinder, as recited in claim 2, wherein said second piston further includes:

a second groove located on said first diameter section, said second groove being connected to said first groove to permit fluid communication between said actuation chamber and the reservoir upon termination of the operator input force.

4. The two stage master cylinder, as recited in claim 3, further including:

second seal means having a lip which projects into said second groove, said lip engaging said first diameter section of said first cylindrical body to prevent communication of fluid from the actuation chamber to said first groove upon movement of said second piston means.

5. A two stage master cylinder comprising:

a housing having a first diameter bore separated from a larger second diameter bore by a shoulder and a reservoir connected to said first diameter bore;

a first piston located in said first diameter bore and cooperating with said housing to define a first chamber in said first diameter bore;

a second piston having a first cylindrical body with a first diameter section extending from a second diameter section into said first diameter bore and cooperating with said housing and said first piston to define a second chamber in said first diameter bore, said second diameter section cooperating with said first diameter section, said shoulder, and said housing to define an actuator chamber in said second diameter bore, said first cylindrical body having a stepped axial bore extending through said first diameter section to a point adjacent said second diameter section, said first cylindrical body having a first radial passage for connecting said actuation chamber with said axial bore and a second axial passage for connecting said axial bore to said reservoir;

shuttle means located in said stepped axial bore of said first cylindrical body having a first surface exposed to the fluid in said second chamber and a second surface exposed to the fluid in said actuation chamber, said first surface being larger than said second surface;

first seal means associated with said shuttle means for controlling the communication of fluid from said stepped axial bore into said second chamber and said reservoir;

resilient means connected to said shuttle means for urging said first surface toward said second chamber; and input means connected to said second piston and responsive to an input force for moving said first diameter section in said first diameter bore and said second diameter section in said second diameter bore to create an actuation fluid pressure in said actuation chamber and an operational fluid pressure in said second chamber, said actuation fluid pressure being communicated to said second chamber by flowing through said first radial passage into said stepped axial bore and around said first seal means, said operational fluid pressure acting on said first surface and moving said shuttle means in opposition to said resilient means and actuation fluid pressure acting on said second surface to communicate said axial bore to said reservoir and thereby relieve the actuation fluid pressure from said second bore to permit the entire input force to be communicated into said second piston means for moving said first diameter section in the first diameter bore and pressurize the fluid in the second chamber;

a first groove on said second piston located between a first land and a second land on the first diameter section of said first cylindrical body, said second radial passage terminating in said first groove adjacent said first land, said first groove connecting said second radial passage with said reservoir upon movement of said second piston;

a second groove on said second piston located on said first diameter section, said second groove being connected to said first groove to permit fluid communication between said actuation chamber and the reservoir upon termination of the operator input force;

second seal means located adjacent said shoulder on the housing having a lip which projects into said second groove, said lip engaging said first diameter section of said first cylindrical body to prevent communication of fluid from the actuation chamber upon movement of said second piston means; and said shuttle means including a second cylindrical body having a first section separated from a second section by a second shoulder, said second shoulder cooperating with said stepped axial bore and the first section of said second cylindrical body to define a dampening chamber, said dampening chamber being connected to said first groove by a third radial passage in said first cylindrical body, said third radial passage metering fluid to said first groove to control the rate of movement of said shuttle means.

6. The two stage master cylinder, as recited in claim 5, wherein said shuttle means further includes:

a first annular rib and a second annular rib on the first section of said second cylindrical body, said first and second annular ribs cooperating with said first section of said second cylindrical body and said first section of said first cylindrical body to define a control chamber in said stepped axial bore, said second cylindrical body having a control passage extending from said second surface to said control chamber, said actuation fluid pressure being communicated from said stepped axial bore into said control chamber through said control passage, said actuation fluid pressure acting on said second annular rib and moving the second cylindrical body to establish communication between said control chamber and said second radial passage and thereafter proportionally reduce the actuation fluid pressure in the actuation chamber to the fluid pressure in the reservoir.

7. The two stage master cylinder, as recited in claim 6, wherein said first seal means includes:

a first lip seal located adjacent said first rib and a second lip seal located adjacent said second rib, said first lip seal allowing the actuation fluid pressure to freely flow from the control chamber to the second chamber while preventing the operational fluid pressure from being communicated into the control chamber.

8. The two stage master cylinder, as recited in claim 7, wherein said first piston includes:

a third cylindrical body having an axial passage therethrough for connecting the first and second chambers with a pressure differential chamber contained therein, said third cylindrical body having a first and second axial slot located on the peripheral surface thereof.

9. The two stage master cylinder as recited in claim 8, further including:

a bolt attached to said housing and extending through said first diameter bore into said first slot to prevent said third cylindrical body from rotating;

a movable wall located in said pressure differential chamber for preventing communication between said first and second chambers through said axial passage; and a plunger connected to a switch attached to said housing, said plunger extending into said second slot in said third cylindrical body, said plunger responding to movement of said wall in said pressure differential chamber causing a predetermined difference between the fluid pressure in the first and second chambers to activate the switch and inform the operator of this pressure condition in the master cylinder.

10. The two stage master cylinder, as recited in claim 9, further including:

a first valve located in a first outlet port of said first chamber for controlling the communication of the operational fluid pressure to the rear wheel brakes of a vehicle as a function of the input force; and a second valve located in a second outlet port of said second chamber for metering the communication of the operational fluid pressure to the front wheel brakes of a vehicle as a function of the input force and thereby synchronize the operation of the front and rear wheel brakes.

* * * * *